United States Patent [19]

Lee et al.

[11] Patent Number: 5,659,524
[45] Date of Patent: Aug. 19, 1997

[54] APPARATUS FOR CONTROLLING TAPE-EJECTION IN AN AUTOMOBILE-INSTALLED VIDEO CASSETTE RECORDER

[75] Inventors: Kyeong-Won Lee; Ul-Je Kim, both of Seoul, Rep. of Korea

[73] Assignee: Daewoo Electronics Co., Ltd., Seoul, Rep. of Korea

[21] Appl. No.: 516,242

[22] Filed: Aug. 17, 1995

[30] Foreign Application Priority Data

Dec. 16, 1994 [KR] Rep. of Korea ............... 94-34551

[51] Int. Cl.$^6$ .............. G11B 31/00; H04B 1/20
[52] U.S. Cl. ................................ 369/21; 369/6
[58] Field of Search .................... 369/21, 6, 7, 8, 369/10, 11, 12, 75.1; 455/345, 90, 344, 349

[56] References Cited

U.S. PATENT DOCUMENTS 4,766,580  8/1988  Go et al. ........................... 369/21

Primary Examiner—Ali Neyzari
Attorney, Agent, or Firm—Pennie & Edmonds LLP

[57] ABSTRACT

An apparatus capable of performing an automatic tape ejection operation in an automobile-installed video cassette recorder comprises an input power detector for detecting an electrical disconnection between an automobile battery and the video cassette recorder when the automobile is turned off, a system controller, upon detecting the disconnection of the electrical power, for generating a switching control signal for a predetermined time period and a switch circuit, in response to the switching control signal, for electrically connecting the battery to a deck mechanism for the predetermined time period in which the tape ejection operation is executed.

1 Claim, 2 Drawing Sheets

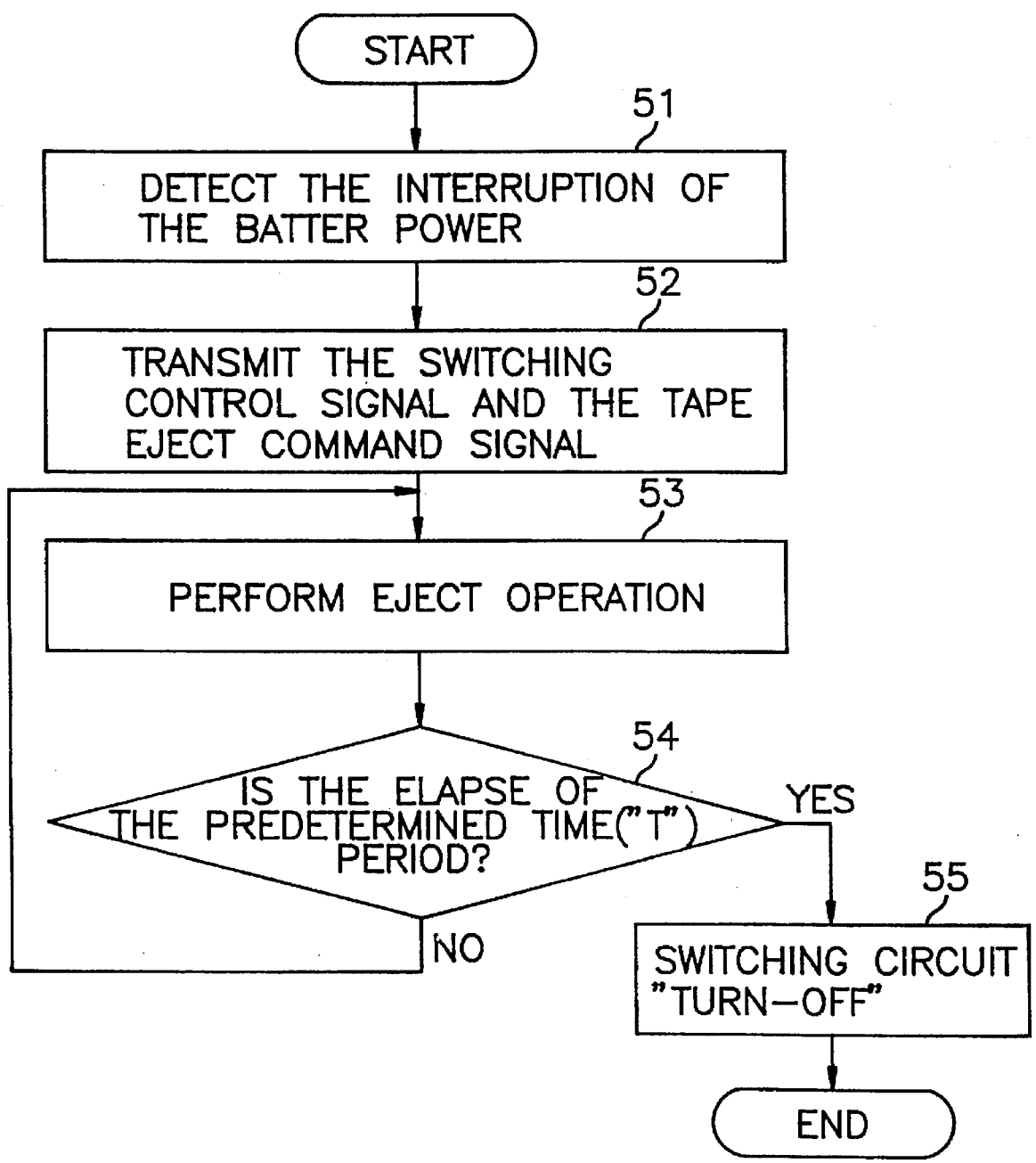

APPARATUS FOR CONTROLLING TAPE-EJECTION IN AN AUTOMOBILE-INSTALLED VIDEO CASSETTE RECORDER

FIELD OF THE INVENTION

The present invention relates to an apparatus for use in a video cassette recorder ("VCR") installed in an automobile; and, more particularly, to an apparatus capable of automatically performing a tape-ejection operation in the VCR when the ignition system of an automobile is turned off.

BACKGROUND OF THE INVENTION

Currently, a variety of electronic equipment, such as cassette tape player, compact disk player, cellular phone, and VCR, is available for installation in an automobile. Such automobile-installed electronic equipment is usually powered by the automobile's battery.

When the automobile's ignition system is turned on, an ignition switch connects electrically the battery to the electronic equipment's power supply. Likewise, the electronic equipment is disconnected from the battery when the automobile ignition is turned off.

When a VCR equipped automobile's ignition is turned off, therefore, the supply of power to the VCR is automatically interrupted. In such event, if there is a video cassette already loaded in the VCR, the VCR does not have the opportunity to eject it prior to being shut down. This may present a number of problems, particularly in the summer when a high temperature inside the automobile melt the video cassette tape, which may in turn adhere to the VCR's drum.

SUMMARY OF THE INVENTION

It is, therefore, a primary object of the present invention to provide an apparatus capable of automatically performing a tape-ejection operation in an automobile-installed VCR when the automobile ignition system is turned off.

In accordance with the present invention, there is provided an apparatus capable of performing an automatic tape-ejection operation of a VCR installed in an automobile having a battery and an ignition switch located electrically between the VCR and the battery, which comprises: means for detecting an electrical disconnection between the battery and the VCR through the ignition switch and for producing a power off detection signal; means, in response to the power off detection signal, for generating a switching control signal for a predetermined time period; means, in response to the power off detection signal, for generating a tape eject command signal to carry out the tape ejection operation; means for performing the tape ejection operation in accordance with the tape eject command signal; and means, in response to the switching control signal, for electrically connecting the battery to the tape ejection means for the predetermined time period.

BRIEF DESCRIPTION OF THE DRAWINGS

The above and other objects and features of the present invention will become apparent from the following description of preferred embodiments, when taken in conjunction with the accompanying drawings, in which:

FIG. 2 shows a flow diagram describing the automatic tape-ejection procedure of the inventive apparatus shown in FIG. 1.

DETAILED DESCRIPTION OF THE PREFERRED EMBODIMENTS

Figure 1:
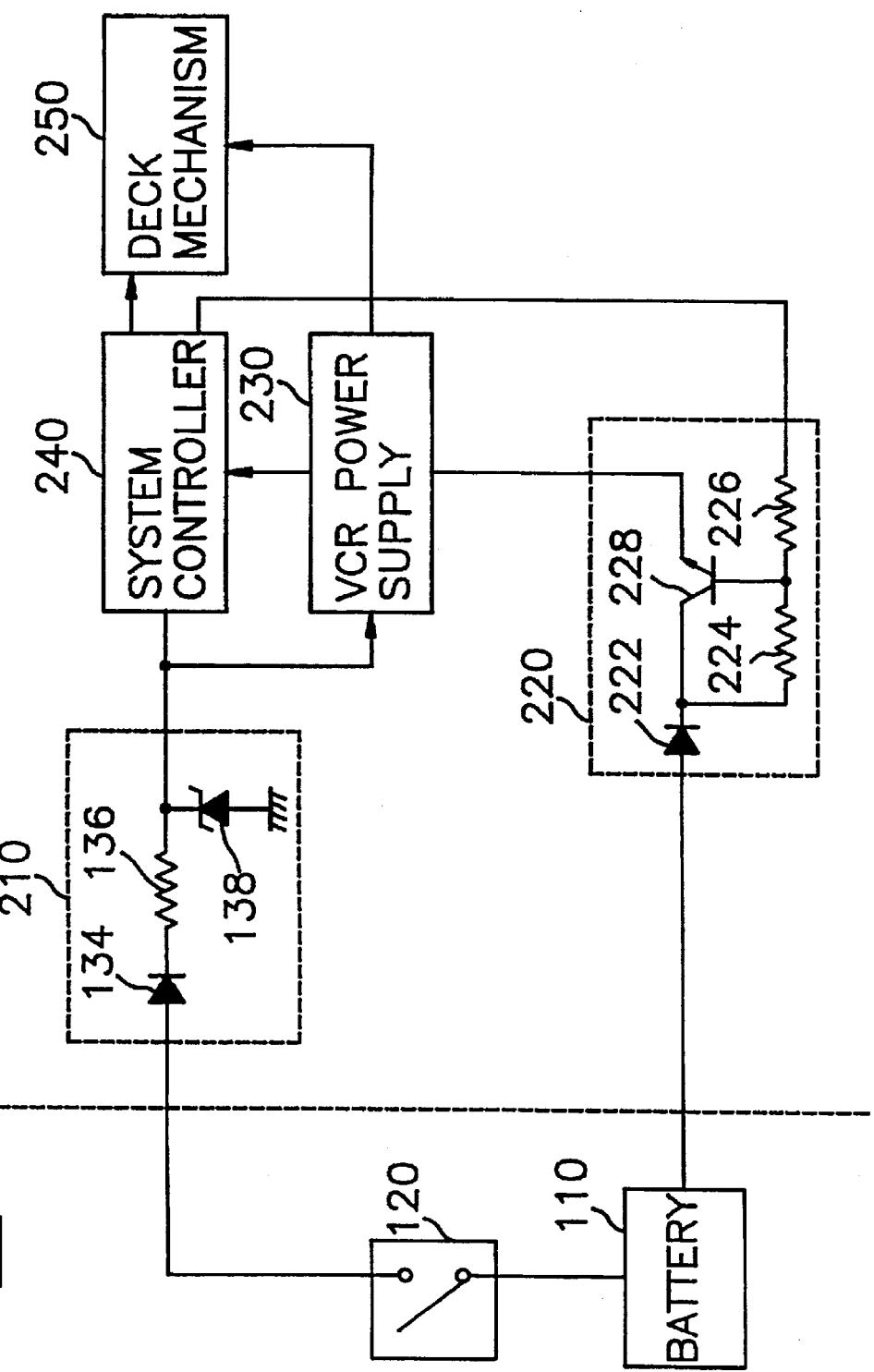
FIG. 1 presents a block diagram of an apparatus capable of automatically controlling the tape-ejection operation of an automobile-installed VCR in accordance with the present invention.

Referring to FIG. 1, there is shown a block diagram of an apparatus for automatically controlling the tape-ejection operation of an automobile-installed VCR when the ignition system of the automobile is turned off. The automobile 100 includes a battery 110 and an ignition switch 120 located electrically between the battery 110 and the VCR 200.

The VCR 200 comprises an input power detector 210, a switch circuit 220, a VCR power supply 230, a system controller 240 and a deck mechanism 250.

When the ignition switch 120 of the automobile 100 is turned on, the battery 110 supplies electrical power to the VCR power supply 230 and the input power detector 210.

The VCR power supply 230 converts the electrical power from the battery 110 into an effective electrical current needed to operate the individual components that make up the VCR, e.g., the system controller 240 and the deck mechanism 250.

The input power detector 210 detects whether or not the VCR 200 is being supplied with the electrical power from the battery 110. The input power detector 210 comprises a diode 134 and a resistor 136 in series and a zener diode 138 coupled to the series connection in parallel. When the ignition switch 120 is switched-on, the electrical power from the battery 110 is applied through the diode 134 and the resistor 136 to the system controller 240. The zener diode 138 serves to regulate the electrical power in a predetermined level, e.g., a logic high of 5 V, adapted for the system controller 240 to recognize the supply of the electrical power. However, when the ignition switch 120 is turned off, the input power detector 210 detects the disconnection of the electrical power from the battery 110 and produces a power off detection signal in a second level, e.g., a logic low of 0 V, which is then provided to the system controller 240.

The switch circuit 220, which is located between the battery 110 and the VCR power supply 230, serves to selectively supply the electrical power from the battery 110 to the VCR power supply 230 under the control of the system controller 240. The switch circuit 220 includes a diode 222, a pair of bias resistors 224 and 226 and a switching transistor 228 having a base connected to the system controller 240, an emitter connected to the battery 110 and a collector connected to the VCR power supply 230.

The system controller 240, which is of a conventional micro-processor, in response to the power off detection signal, transmits a switching control signal to the switch circuit 220 for a predetermined time period and a tape-eject command signal to the deck mechanism 250. The tape-eject command signal prompts the deck mechanism 250 to eject a tape cassette loaded therein while the switching control signal enables the electrical power from the battery 110 to be supplied to the VCR power supply 230 through the switch circuit 220. In this way, the switching control signal provides a path for the supply of the electrical power to the power supply 230 so that the deck mechanism 250 will be supplied with the electrical power during the predetermined time period in which the tape ejection operation is successfully executed. Although it is not specifically disclosed and shown herein, an auxiliary back-up battery may be used to maintain the system controller during the duration from the disconnection of the electrical power until the switch circuit begins to supply electrical power therethrough.

FIG. 2 shows an exemplary flow diagram illustrating the tape-ejection procedure of the automobile-installed VCR in accordance with the present invention. The tape-ejection procedure pertains to a situation wherein the ignition switch 120 of the automobile is turned-off while a tape cassette is still loaded in the VCR.

First, at a block 51, the input power detector 210 detects the disconnection of the electrical power from the battery 110 and transmits the power off detection signal to the system controller 240.

At a block 52, the system controller 240, upon receiving the power off detection signal, transmits the switching control signal to the switch circuit 220 and the tape eject command signal to the deck mechanism 250. The switching control signal dictates the switch circuit 220 to supply the electrical power to the deck mechanism 250 through the VCR power supply 230 for the duration of the tape cassette ejection procedure, and the tape eject command signal directs the deck mechanism 250 to eject the video cassette loaded in the VCR.

Accordingly, the system control 240 applies the switching control signal to the base of the transistor 228 in the switch circuit 220 for the predetermined time period. Therefore, the transistor 228 is turned on, and continues to allow the battery 110 to supply the electrical power to the VCR power supply 230 during the predetermined time period.

Meanwhile, at a block 53, the deck mechanism 250 carries out the tape-ejection procedure during the predetermined time period.

Thereafter, at a block 54, it is determined whether the predetermined time period has elapsed or not. If the result is positive, the system controller 240 stops applying the switching control signal to turn off the transistor 228 in order to prevent a further consumption of the electrical power. Otherwise, the control process returns to the block 53 and the tape cassette ejection procedure is continued.

While the present invention has been described with respect to the particular embodiments described above, it will be apparent to those skilled in the art that various changes and modifications may be made without departing from the spirit and scope of the invention as defined in the following claim.

What is claimed is:

1. An apparatus capable of performing an automatic tape-ejection operation of a video cassette recorder installed in an automobile having a battery and an ignition switch located electrically between the video cassette recorder and the battery when the ignition system of the automobile is turned off, which comprises:

means for detecting an electrical disconnection between the battery and the video cassette recorder through the ignition switch and for producing a power off detection signal;

means, in response to the power off detection signal, for generating a switch control signal for a predetermined time period;

means, in response to the power off detection signal, for generating a tape ejection command signal to carry-out the tape ejection operation;

means for performing the tape ejection operation in accordance with the tape ejection command signal; and switching means, in response to the switch control signal, for electrically connecting the battery to the tape ejection means for the predetermined time period, wherein the switching means includes a switching transistor having a base connected to the switch control signal generating means, an emitter connected to the battery and a collector connected to the tape ejection means.

* * * * *